March 25, 1924.
J. C. MORGAN
WHEEL
Filed Aug. 29, 1921
1,488,022
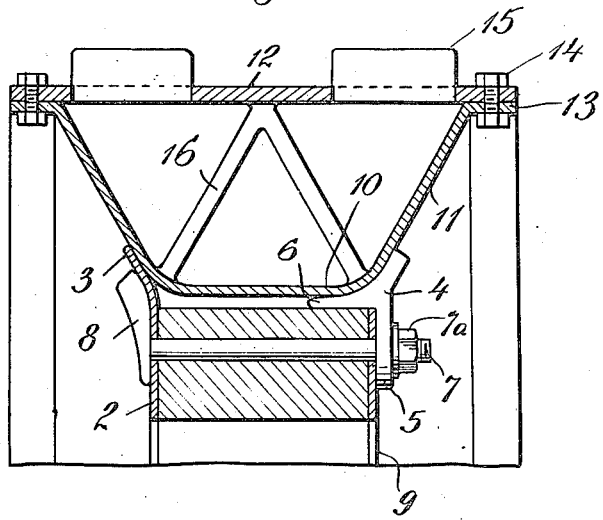
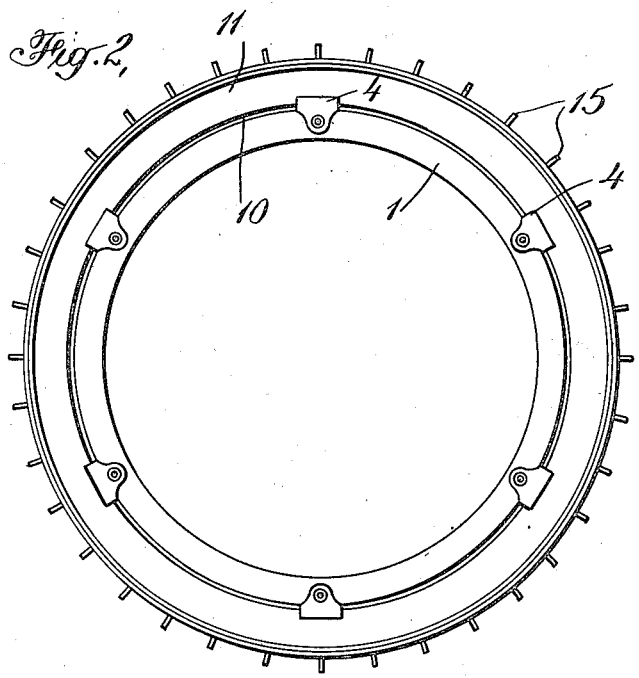
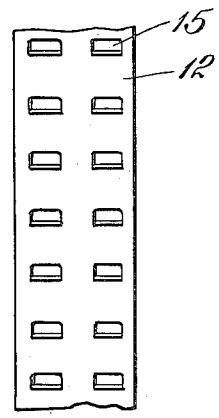
INVENTOR
J. C. Morgan
BY
ATTORNEYS Patented Mar. 25, 1924.                                          1,488,022

UNITED STATES PATENT OFFICE.

JESSE CANBY MORGAN, OF PORTLAND, OREGON.

WHEEL.

Application filed August 29, 1921. Serial No. 496,213.

*To all whom it may concern:*

Be it known that I, JESSE CANBY MORGAN, residing at Portland, in the county of Multnomah, State of Oregon, have invented certain new and useful Improvements in Wheels; and I do hereby declare the following to be a full, clear, and exact description of the invention, such as will enable others skilled in the art to which it appertains to make and use the same.

My invention is an improvement in wheels, and relates particularly to a new and improved construction of traction tread, adapted for use with demountable rims. Because of their rounded construction, pneumatic tires do not engage the road bed over a sufficient area to provide the most efficient gripping effect for size. Under the weight of the load only a relatively small portion of the tread rests upon the road bed. When the road bed is soft, as for instance, in mud, sand and the like, the pneumatic tire for the same reason tends to cut deep into the bed, and the increased traction is more than counterbalanced by the braking action of the soft material. For these reasons, and because of their liability to puncture and blowout, pneumatic tires are not well adapted for certain classes of heavy duty.

Separable traction treads and removable armors have been used but both are objectionable. Both devices are bulky and unsightly, and considerable time is required to remove and replace them.

The object of the present invention is to provide a traction tire or tread, adapted for use with wheels having demountable rims, and which may be substituted for the usual pneumatic tires, merely by demounting the tire with the split rim and replacing tire and rim by the traction tire or tread, with no more time or labor required than in the change of a tire.

In the drawings:

Fig. 1 is a radial section through a part of a wheel having the improved tread;

Fig. 2 is a side view of the wheel;

Fig. 3 is a plan view of a part of the tread;

In the present embodiment of the invention, the improved tread is shown in connection with a wheel, having the usual felly 1 and arranged to carry a demountable rim. The retaining mechanism of the rim is of usual construction consisting of a retaining ring 2 fitting one side of the felly and extending beyond the same as shown. The outer edge of the retaining ring is bent outward as indicated at 3, and the demountable rim seats on this outwardly bent portion 3. The rim is held in place at the opposite side of the wheel, by means of locking lugs 4. Each of these lugs has a portion 5 fitting along side the face of the felly, and a portion 6 extending at right angles thereto, and fitting against the peripheral surface of the felly. The lugs are held in place by bolts 7 and nuts $7^a$, the bolts being passed through the felly and through an opening in the portion 5 of the lugs and being engaged by the nut $7^a$ outside of the lug. The head 8 of the bolt is shaped to fit the outer face of the retaining ring 2, and a somewhat similar ring 9 is arranged at the opposite face of the felly from the ring 2, between the lug 4 and the felly. In order to demount a tire, the nuts $7^a$ of the bolts 7 are loosened until the lugs 4 can be slipped out of place and swung inwardly within the peripheral surface of the felly. When so swung, the rim carrying the pneumatic tire can be removed from the wheel.

My improved tread is in the form of a rim 10, of a size to fit upon the wheel, and to be supported by the retaining ring 2—3, and the lugs 4. The side walls of the rim are extended as shown at 11 and flared outwardly away from each other, and a tread ring 12 is secured to the extended side walls. Each of these side walls has an outwardly bent flange 13 at its free edge, and the adjacent edge of the tread ring 12 is securely connected to this flange, as for instance, by screw bolts and nuts 14. The bolts have treaded engagement with the rim and ring, and securely connect the tread ring to the rim. The tread ring is cylindrical and is provided at intervals with struck up lugs 15 which insure a firm grip of the tread on the road bed. If desired, the tread ring may be braced and supported intermediate its side edges by braces indicated at 16. Such braces may be cast with the rim and they may be in the form of inverted V shaped bars, or they may be webs converging outwardly. That is, the braces may extend circumferentially of the rim practically the full extent thereof, or they may be short sections.

The improved tread may be substituted for the usual tire, in any wheel having a demountable rim, it being understood, of course, that the traction tread tire is of the proper size for the wheel. Thus, the wheel may be used either as a traction wheel with the improved tread, or as a cushion wheel with the pneumatic tire. The rim 10—11 and the braces 16 may be cast together, and the tread ring afterwards secured to the rim.

I claim:

1. In combination with a wheel, a demountable tread tire comprising a channel shaped rim adapted to seat upon the wheel and to be held by the holding means for the demountable rim, a traction ring secured at its edges to the edges of the channel shaped rim and having traction lugs on its outer surface, and braces between the center of the traction ring and the rim.

2. In combination with a wheel, a demountable tread tire comprising a channel shaped rim adapted to seat upon the wheel and to be held by the holding means for the demountable rim, a traction ring secured at its edges to the edges of the channel shaped rim and having traction lugs on its outer surface.

3. A traction tread for wheels having demountable rims, comprising a channel shaped rim adapted to seat upon the wheel and to be removably held thereon, a traction ring having traction lugs secured to the channel shaped rim, and braces between the said rim and the ring.

In testimony whereof I affix my signature.

JESSE CANBY MORGAN.